US008483483B2

(12) United States Patent
Ohnishi

(10) Patent No.: US 8,483,483 B2
(45) Date of Patent: Jul. 9, 2013

(54) IMAGE FORMING APPARATUS FOR EXTRACTING HAND-WRITTEN IMAGE

(75) Inventor: Kazuyuki Ohnishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 299 days.

(21) Appl. No.: 12/766,375

(22) Filed: Apr. 23, 2010

(65) Prior Publication Data

US 2010/0272362 A1 Oct. 28, 2010

(30) Foreign Application Priority Data

Apr. 24, 2009 (JP) ................................ P2009-106063

(51) Int. Cl.
*G06K 9/34* (2006.01)
*G06K 9/18* (2006.01)

(52) U.S. Cl.
USPC .......................................... 382/179; 382/186

(58) Field of Classification Search
USPC ................ 382/100, 184–187, 190, 179, 309, 382/284, 177; 358/1.13–1.15, 451, 474; 713/243, 245; 209/584
See application file for complete search history.

(56) References Cited

U.S. PATENT DOCUMENTS

| 3,699,518 | A | * | 10/1972 | Greenough et al. | 382/184 |
|---|---|---|---|---|---|
| 4,020,463 | A | * | 4/1977 | Himmel | 382/242 |
| 5,199,081 | A | * | 3/1993 | Saito et al. | 382/116 |
| 5,363,211 | A | * | 11/1994 | Hasebe et al. | 358/451 |
| 5,457,540 | A | * | 10/1995 | Kajita | 358/296 |
| 5,521,991 | A | * | 5/1996 | Billings | 382/317 |
| 5,857,029 | A | * | 1/1999 | Patel | 382/119 |
| 6,130,962 | A | * | 10/2000 | Sakurai | 382/190 |
| 6,166,750 | A | * | 12/2000 | Negishi | 347/131 |
| 6,291,785 | B1 | * | 9/2001 | Koga et al. | 209/584 |
| 6,304,341 | B1 | * | 10/2001 | Koide et al. | 358/1.9 |
| 6,317,762 | B1 | * | 11/2001 | Okawa et al. | 715/246 |
| 6,341,350 | B1 | * | 1/2002 | Miyahara et al. | 713/176 |
| 6,473,535 | B1 | * | 10/2002 | Takaoka | 382/274 |
| 6,707,465 | B2 | * | 3/2004 | Yamazaki et al. | 345/629 |
| 6,714,322 | B1 | * | 3/2004 | Minamino | 358/3.06 |

(Continued)

FOREIGN PATENT DOCUMENTS

| JP | 3-239267 A | 10/1991 |
|---|---|---|
| JP | 6-309500 A | 11/1994 |

(Continued)

*Primary Examiner* — Wenpeng Chen
*Assistant Examiner* — Feng Niu
(74) *Attorney, Agent, or Firm* — Birch, Stewart, Kolasch & Birch, LLP

(57) ABSTRACT

An image forming apparatus that allows easy and reliable extraction of a hand-written image and allowing reliable execution of a desired process on image data based on the hand-written image is provided. For this purpose, during a mark adding process, a scanner unit and an image processing unit form YMCK data based on an original image; a specific area extracting unit extracts image data of a specific area from the YMCK data; a mark image adding unit combines image data of the specific area with the mark image data to form combined data; and a printer unit outputs a first image based on the combined data. During image processing of the specific area, the scanner unit forms RGB data based on the first image; the mark area extracting unit extracts image data of the mark area from the RGB data; the specific area image processing unit performs prescribed image processing on the image data of mark area; and the printer unit outputs a second image based on the YMCK data after the prescribed image processing.

10 Claims, 11 Drawing Sheets

U.S. PATENT DOCUMENTS

| | | | |
|---|---|---|---|
| 6,867,875 B1* | 3/2005 | Kanai et al. | 358/1.15 |
| 6,940,617 B2* | 9/2005 | Ma et al. | 358/1.15 |
| 7,077,313 B2* | 7/2006 | Chung et al. | 235/386 |
| 7,222,235 B1* | 5/2007 | Mitsui | 713/176 |
| 7,290,210 B2* | 10/2007 | Silverbrook et al. | 715/230 |
| 7,293,712 B2* | 11/2007 | Wang | 235/462.01 |
| 7,468,801 B2* | 12/2008 | Wakeam et al. | 358/1.14 |
| 7,616,333 B2* | 11/2009 | Wakeam et al. | 358/1.14 |
| 7,720,286 B2* | 5/2010 | Clary | 382/187 |
| 2001/0010733 A1* | 8/2001 | Tomomatsu | 382/135 |
| 2002/0018228 A1* | 2/2002 | Torigoe | 358/1.14 |
| 2004/0012819 A1* | 1/2004 | Nakashige et al. | 358/3.26 |
| 2004/0125983 A1* | 7/2004 | Reed et al. | 382/100 |
| 2005/0063742 A1* | 3/2005 | Roddy et al. | 399/311 |
| 2005/0280876 A1* | 12/2005 | Wang et al. | 358/3.28 |
| 2006/0077419 A1* | 4/2006 | Sugiura et al. | 358/1.14 |
| 2006/0120605 A1* | 6/2006 | Poor | 382/186 |
| 2006/0159345 A1* | 7/2006 | Clary et al. | 382/186 |
| 2006/0170968 A1* | 8/2006 | Maki et al. | 358/1.15 |
| 2006/0181564 A1* | 8/2006 | Asano | 347/19 |
| 2006/0267965 A1* | 11/2006 | Clary | 345/179 |
| 2006/0279767 A1* | 12/2006 | Lim | 358/1.14 |
| 2006/0291723 A1* | 12/2006 | Koyama et al. | 382/181 |
| 2007/0019836 A1* | 1/2007 | Thorwirth | 382/100 |
| 2007/0035758 A1 | 2/2007 | Hasuike | |
| 2007/0076980 A1* | 4/2007 | Maeda et al. | 382/284 |
| 2007/0079124 A1* | 4/2007 | Maeno | 713/176 |
| 2007/0091350 A1* | 4/2007 | Aritomi et al. | 358/1.14 |
| 2007/0201768 A1* | 8/2007 | Schiehlen | 382/309 |
| 2008/0022111 A1* | 1/2008 | Dietl | 713/176 |
| 2008/0069473 A1* | 3/2008 | Tojo | 382/276 |
| 2008/0080009 A1* | 4/2008 | Masui et al. | 358/3.28 |
| 2008/0089586 A1* | 4/2008 | Igarashi et al. | 382/187 |
| 2008/0144131 A1 | 6/2008 | Jung et al. | |
| 2008/0151300 A1* | 6/2008 | Kowaka et al. | 358/1.15 |
| 2008/0151312 A1* | 6/2008 | Nakano | 358/3.28 |
| 2008/0180753 A1* | 7/2008 | Maeno | 358/3.28 |
| 2008/0205695 A1* | 8/2008 | Saito | 382/100 |
| 2008/0292129 A1* | 11/2008 | Fan et al. | 382/100 |
| 2009/0060335 A1* | 3/2009 | Rodriguez Serrano et al. | 382/177 |
| 2009/0180152 A1* | 7/2009 | Bala et al. | 358/3.28 |
| 2010/0008581 A1* | 1/2010 | Bressan | 382/177 |
| 2010/0182653 A1* | 7/2010 | Ireland et al. | 358/474 |

FOREIGN PATENT DOCUMENTS

| | | |
|---|---|---|
| JP | 2005-167875 A | 6/2005 |
| JP | 2005-175565 A | 6/2005 |
| JP | 2007-49636 A | 2/2007 |
| JP | 2008-244612 A | 10/2008 |

* cited by examiner

IMAGE FORMING APPARATUS FOR EXTRACTING HAND-WRITTEN IMAGE

CROSS-REFERENCE TO RELATED APPLICATION

This nonprovisional application claims priority under 35 U.S.C. §119(a) on Patent Application No. 2009-106063 filed in Japan on Apr. 24, 2009, the entire contents of which are hereby incorporated by reference.

BACKGROUND OF THE INVENTION

1. Field of the Invention

The present invention relates to an image forming apparatus and, more specifically to a technique for extracting a hand-written image.

2. Description of the Background Art

Conventionally, many techniques have been proposed for extracting image data based on an image written by hand (hereinafter referred to as "hand-written image") using a pen or the like on an original image from image data of original image and performing various image processing operations including erasure and emphasis on the extracted image data.

By way of example, Japanese Patent Laying-Open No. 2005-175565 (hereinafter referred to as "'565 application'") discloses a technique in which a line segment of a prescribed length or longer of an input image data and a color spectrum of the line segment are detected, for discriminating a part of the image data having the same color spectrum as the detected line segment to be an original part, and a part having a different color spectrum to be a hand-written part.

Further, Japanese Patent Laying-Open No. 2005-167875 (hereinafter referred to as "'875 application'") discloses a technique in which a copy image is read and an area surrounded by a half-tone line segment written by hand using a marker or the like on the copy image is recognized, and of the original image data stored beforehand in an image forming apparatus, image data on the inside or outside of the area corresponding to the recognized area is subjected to processes such as trimming or masking.

According to the technique disclosed in '565 application, when the color spectrum of the original image is distinctively different from the color spectrum of the hand-written image, for example, when a hand-written image is written with red ink on a black-and-white image, the position of hand-written part can accurately be discriminated. On the other hand, if the color spectrum of the original image and the hand-written image are intricate, for example, when a hand-written image is written on a color image or when hand-written images are written using pens of different colors on the original image, erroneous discrimination may be possible.

According to the technique disclosed in '875 application, if a user wishes to extract a desired area, he/she must draw a line surrounding the desired area using a marker or the like. Therefore, if a hand-written image is to be erased, for example, it is necessary to additionally draw a hand-written surrounding line. Further, if the hand-written area and the original image are mixed in an intricate manner, the task of forming the surrounding line itself is difficult and impractical.

SUMMARY OF THE INVENTION

An object of the present invention is to provide an image forming apparatus allowing easy and reliable extraction of a hand-written image. Another object of the present invention is to provide an image forming apparatus that can reliably execute a desired process on image data based on a hand-written image.

According to an aspect, the present invention provides an image forming apparatus, including: a first image data forming unit forming a first image data based on an original image including a specific area; a specific area extracting unit extracting image data of the specific area from the first image data; a mark image adding unit combining the extracted image data of the specific area of the first image data and a mark image data for outputting a mark image, for forming combined data; and a first output unit for outputting a first image including a mark area as an area where the mark image is formed, based on the combined data.

Since a mark area is formed in the area correspond to the specific area of the original image, it becomes possible to reliably and easily extract the hand-written image formed on the area corresponding to the specific area, by extracting the mark area.

Preferably, the specific area is an area where an image is not formed, in the original image.

More preferably, the specific area is an area of a certain predetermined area or larger in which an image having an image density value within a certain predetermined range is formed, of the original image.

More preferably, the specific area is an area where an image having brightness of a certain predetermined value or higher is formed, of the original image.

In this manner, an area where formation of a hand-written image is highly expected is set as the specific area. Therefore, it becomes easier and more reliable to extract the hand-written image.

More preferably, the color of mark image is yellow. Since the mark image is yellow, which is a color difficult to visually recognize, degradation of quality of the first image caused by adding the mark image can be minimized.

More preferably, the mark image is formed of a plurality of dots, and the dot is a point including 1×1 to 8×8 pixels. Since the mark image is formed of sufficiently small dots that are difficult to visually recognize, degradation of quality of the first image caused by adding the mark image can be minimized, and lowering of visibility of the first image can more reliably be prevented.

More preferably, the image forming apparatus further includes: a second image data forming unit forming a second image data based on the first image; a mark area extracting unit extracting image data of the mark area from the second image data; a specific area image processing unit performing prescribed image processing on the extracted image data of the mark area of the second image data; and a second output unit outputting a second image based on the second image data after the prescribed image processing.

In this manner, the image data in the mark area is extracted from the second image data that is based on the first image, and the extracted data of the mark area is subjected to a prescribed image processing. Therefore, it is possible to reliably execute the desired image processing on the image data based on the hand-written image formed in the mark area.

More preferably, the mark image is formed of a plurality of dots arranged to have a known prescribed interval, for example, an interval of 1 mm, from each other, and the mark area extracting unit extracts image data of the mark area from the second image data, by detecting at least a part of the plurality of dots.

In this manner, the plurality of dots forming the mark image are arranged at an interval wider than the thickness of a line image formed by a typically used pen or the like, so that some of the plurality of dots come to be out of the handwritten image. Thus, it is possible to prevent the entire mark image from being covered by the hand-written image. Therefore, even when a hand-written image is formed on the mark image, the image data in the mark area can reliably be extracted and, hence, the hand-written image formed in the mark area can more reliably be extracted.

More preferably, the specific area image processing unit erases the extracted image data of the mark area, of the second image data. Therefore, the hand-written image in the second image can be erased. Even when the original image is lost, a document image similar to the original image can be obtained.

More preferably, the specific area image processing unit performs pattern recognition on the extracted image data of the mark area, of the second image data. As a result, assuming a questionnaire having an answer column as the specific area, it becomes possible to recognize the hand-written image formed on the mark area regardless of the direction of the original image and, therefore, the position of answer column can freely be set. Further, it is possible to determine the direction of the original image with reference to the mark area. Further, it is unnecessary to conduct pattern recognition of the second image data as whole, and pattern recognition can be conducted after determining the direction of the original image. Thus, highly efficient pattern recognition becomes possible.

According to another aspect, the present invention provides an image forming apparatus, including: a first image data forming unit forming a first image data based on a first image including a mark area as an area where a mark image is formed; a mark area extracting unit extracting image data of the mark area, from the first image data; and a specific area image processing unit for performing prescribed image processing on the extracted image data of the mark area, of the first image data; and an output unit outputting a second image based on the first image data after the prescribed image processing.

As the image data in the mark area is extracted from the first image data that is based on the first image, and the extracted data of the mark area is subjected to a prescribed image processing, it is possible to reliably execute the desired image processing on the image data based on the hand-written image formed in the mark area.

According to the present invention, since the mark area is formed in an area corresponding to the specific area of the original image in the first image, it becomes possible to reliably and easily extract a hand-written image formed in the area corresponding to the specific area, by extracting the mark area. Further, the image data in the mark area is extracted from the first or second image data that is based on the first image, and the extracted data of the mark area is subjected to a prescribed image processing. Therefore, it becomes possible to execute the desired image processing reliably on the image data based on the hand-written image formed in the mark area.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
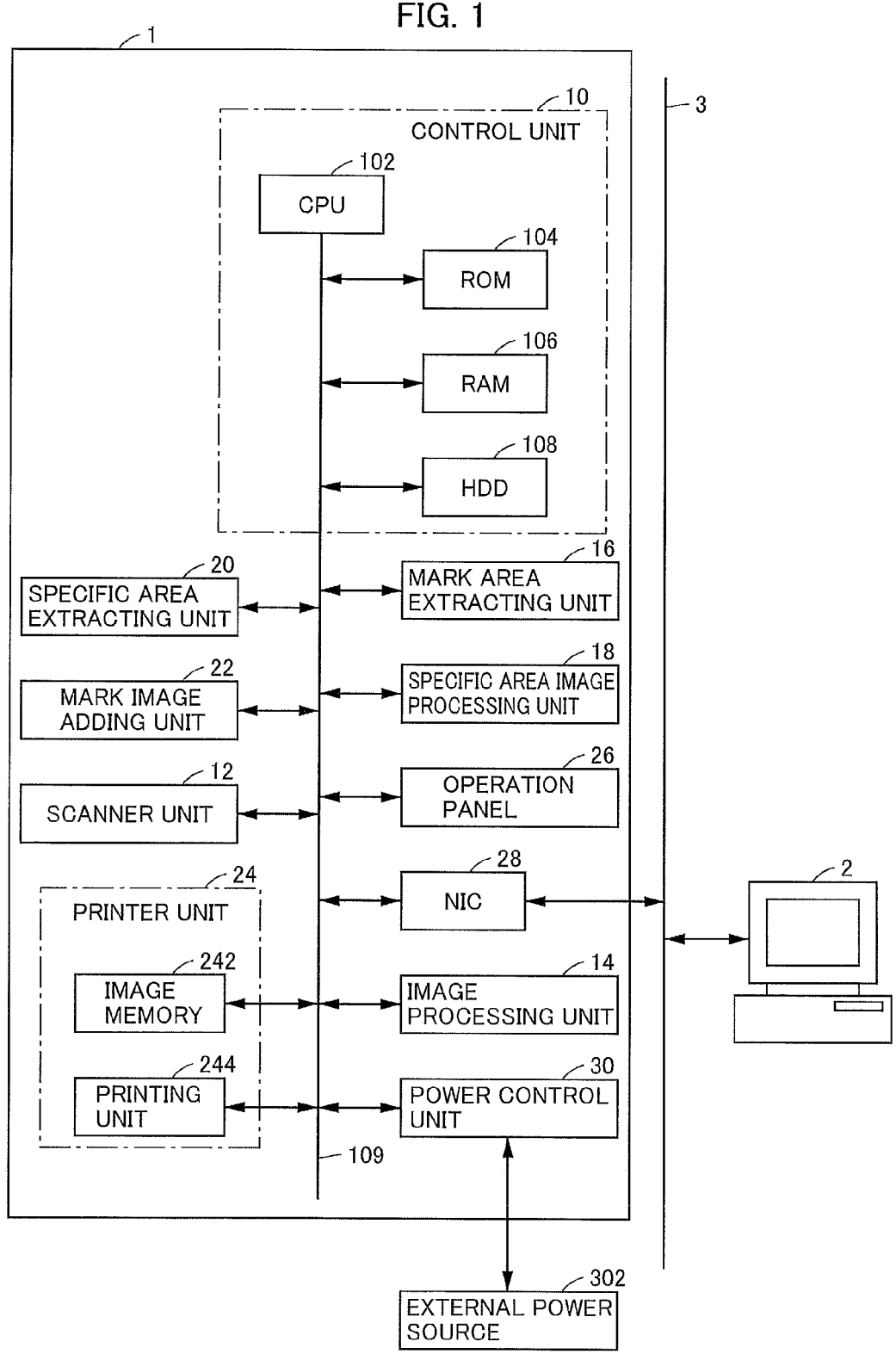
FIG. 1 is a block diagram showing a configuration of an image forming apparatus in accordance with an embodiment of the present invention.

In the following description and in the drawings, the same components are denoted by the same reference characters and same names. Their functions are also the same. Therefore, detailed description thereof will not be repeated.

<Hardware Configuration>

[Image Forming Apparatus 1]

Referring to FIG. 1, an image forming apparatus 1 is a digital multifunctional machine. Image forming apparatus 1 is connected to an information processing apparatus 2 through a network 3 implemented, for example, by LAN (Local Area Network). Image forming apparatus 1 and information processing apparatus 2 can transmit/receive various data including image data to/from each other.

Information processing apparatus 2 is a terminal such as a PC (Personal Computer) operated by a general user to use image forming apparatus 1. Information processing apparatus 2 has installed therein application programs including a drawing tool and a word processor, and a printer driver for realizing an image data printing job. Information processing apparatus 2 can form image data for outputting images including characters and figures, in accordance with instructions of a user using the application programs mentioned above. Information processing apparatus 2 can further convert the formed image data to printer description language using the printer driver, and transmit the converted data to image forming apparatus 1. Though only one information processing apparatus 2 is shown in FIG. 1, actually, there may be a number of information processing apparatuses.

Image forming apparatus 1 includes a control unit 10, a scanner unit 12, an image processing unit 14, a mark area extracting unit 16, a specific area image processing unit 18, a specific area extracting unit 20, a mark image adding unit 22, a printer unit 24, an operation panel 26, an NIC (Network Interface Card) 28 and a power control unit 30.

Control unit 10 is substantially a computer, including a CPU 102, an ROM 104, an RAM 106 and an HDD 108. CPU 102 is connected to a bus line 109 and to bus line 109, ROM 104, RAM 106 and HDD 108 are electrically connected. CPU 102 executes various computer programs in accordance with instructions from operation panel 26 or the like, to realize desired processes such as operations of various parts of image forming apparatus 1 and communication with information processing apparatus 2. The various computer programs mentioned above are stored in advance in ROM 104 or HDD 108, and at the time of executing a desired process, the program is read from ROM 104 or HDD 108 and transferred to RAM 106. CPU 102 reads and interprets a program instruction from an address in RAM 106, designated by a value stored in a register referred to as a program counter, not shown, in CPU 102. CPU 102 further reads data necessary for the operation from an address designated by the read instruction, and executes an operation corresponding to the instruction on the data. The result of execution is also stored in the address designated by the instruction such as RAM 106, HDD 108 or a register in CPU 102.

HDD 108 stores, in addition to computer programs for realizing general operations of image forming apparatus 1, a computer program for realizing the mark adding process and image processing for a specific area, which will be described later. The computer program is provided from information processing apparatus 2 through network 3 and NIC 28. The computer program may be provided by a recording medium, such as a DVD, on which the computer program is recorded. Specifically, the DVD as the recording medium of the computer program may be loaded to a DVD drive (not shown) in image forming apparatus 1, and the computer program may be read from the DVD and installed to HDD 108. HDD 108 further stores various data including image data.

To bus line 109, scanner unit 12, image processing unit 14, mark area extracting unit 16, image processing unit 18 for a specific area, specific area extracting unit 20, mark image adding unit 22, printer unit 24, operation panel 26, NIC 28 and power control unit 30 are further electrically connected.

Figure 2:
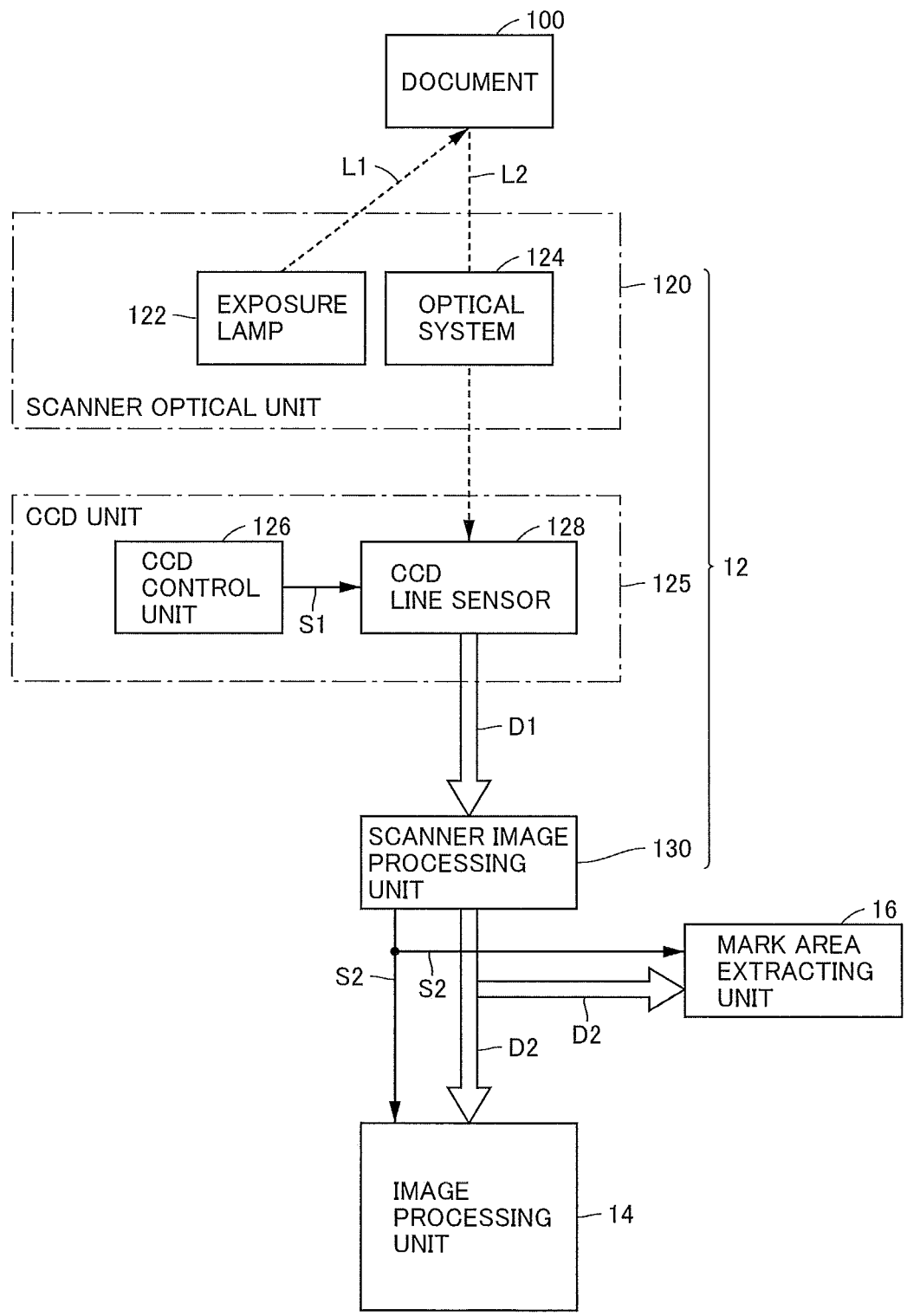
FIG. 2 is a block diagram representing a configuration and an operation of a scanner unit.

Referring to FIG. 2, scanner unit 12 includes: a scanner optical unit 120 including an optical system 124 such as an exposure lamp 122 and lenses; a CCD (Charge-Coupled Device) unit 125 including a CCD control unit 126 and a CCD line sensor 128; and a scanner image processing unit 130. When an original document 100 is placed on a platen (not shown) manually by a user or by an automatic document feeder (not shown) for copying or scanning original document 100, exposure lamp 122 of scanner optical unit 120 emits a light beam L1 to the surface of original image of document 100. A reflected optical image L2 obtained by the irradiation is formed on a CCD line sensor 128 through optical system 124. CCD line sensor 128 is driven by a control signal S1 from CCD control unit 126, and it performs successive photo-electric conversion of the formed reflected optical image L2 to image data D1 and outputs it to scanner image processing unit 130. Scanner image processing unit 130 performs various corrections in accordance with scanner characteristics on image data D1 input from CCD line sensor 128, including, for example, shading correction, and forms RGB (R: Red, G: Green, B: Blue) image data (hereinafter referred to as "RGB data") D2. Then, it successively outputs the formed RGB data D2 to image processing unit 14 in synchronization with a timing signal S2 indicating the timing for transferring RGB data D2. If there is an instruction from the user to execute image processing for the specific area, RGB data D2 and timing signal S2 are successively output not only to image processing unit 14 but also to mark area extracting unit 16.

Figure 3:
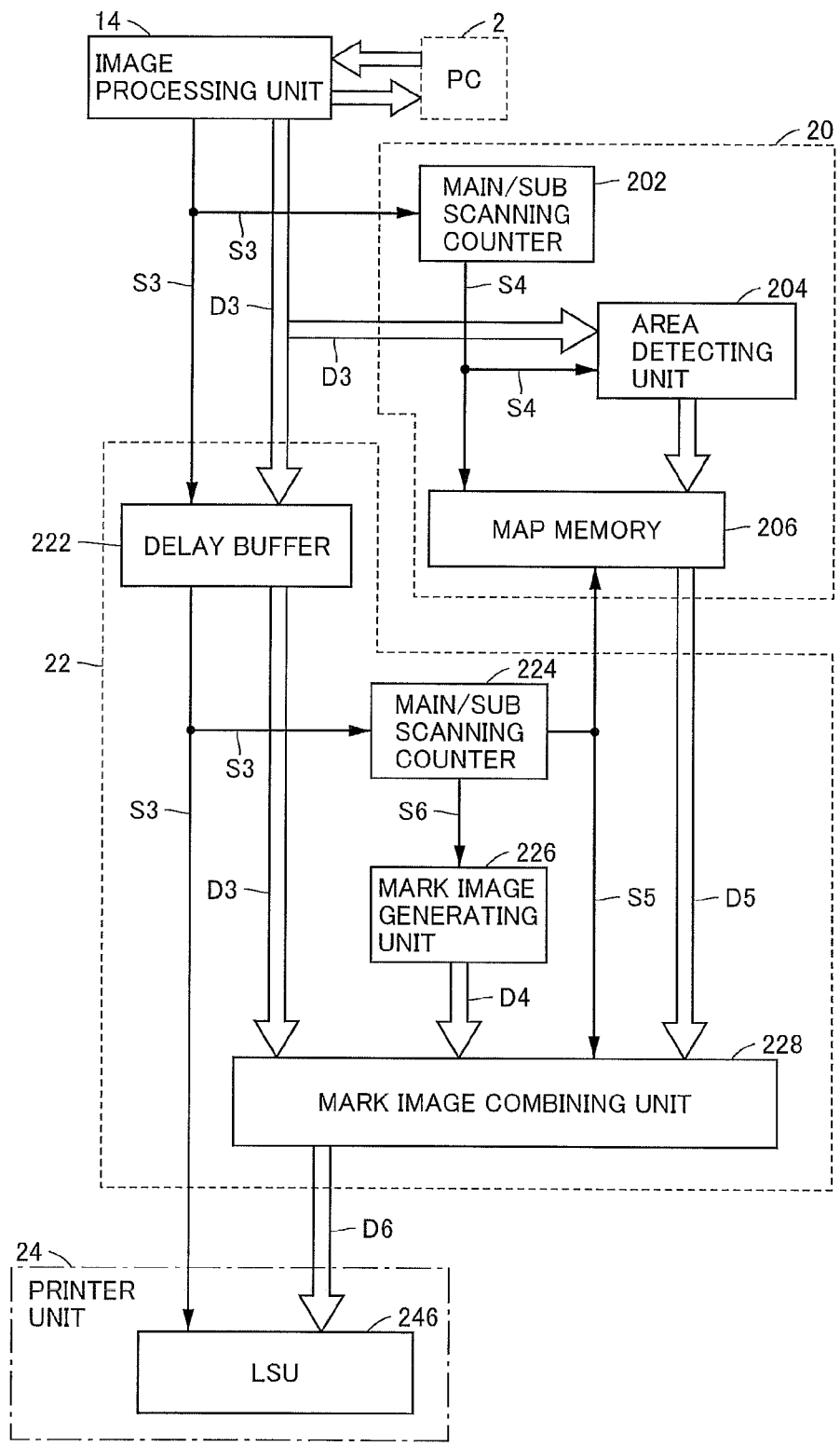
FIG. 3 is a block diagram showing a series of data flow in a mark adding process.

Image processing unit 14 includes an MPU (Micro Processing Unit) and an RAM (both not shown). Referring to FIG. 3, the MPU of image processing unit 14 performs various image processing operations including color correction process such as masking, on RGB data D2 successively input in synchronization with timing signal S2 from scanner image processing unit 130 or on image data transmitted from information processing apparatus 2, on the RAM, and thereby forms YMCK (Y: Yellow, M: Magenta, C: Cyan, K: black) image data (hereinafter referred to as "YMCK data") D3. Then, in synchronization with a timing signal S3 indicating the timing for transferring YMCK data D3, formed YMCK data D3 are successively output to printer unit 24. If there is an instruction from the user to execute the mark adding process, YMCK data D3 and timing signal S3 are successively output to specific area extracting unit 20 and mark image adding unit 22.

Specific area extracting unit 20 includes a main/sub scanning counter 202, an area detecting unit 204, and a map memory 206. In response to the timing signal S3 input from image processing unit 14 at the time of mark adding process, main/sub scanning counter 202 generates an address signal S4 indicating addresses in main and sub scanning directions of YMCK data D3, and successively outputs the generated address signal S4 to area detecting unit 204 and map memory 206. Address signal S4 also has a function of a timing signal that indicates the timing for writing information to map memory 206.

Figure 4:
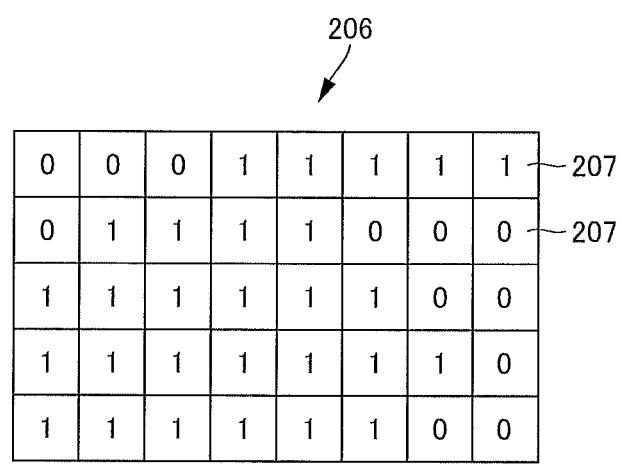
FIG. 4 shows a structure of a map memory.

Referring to FIG. 4, map memory 206 is a memory formed such that one memory cell 207 corresponds to a piece of information of one mark image area, which will be described later. Each memory cell 207 can store information of 1 bit. In map memory 206, if memory cell 207 stores "0", it indicates that the corresponding area is an area where a mark image is not formed, and if it stores "1", it indicates that the corresponding area is where a mark image is formed. Here, the area where the mark image is formed refers to the area corresponding to the area where the image is not formed (hereinafter referred to as the "specific area") of the original image of original document 100. The area where the mark image is not formed refers to the area corresponding to the area where the image is formed (hereinafter referred to as the "image area") of the original image of original document 100. When a timing signal S3 as a last signal indicating stop of printing is input from image processing unit 14, memory cells 207 are all initialized to store "1". Thus, it follows that at the start of mark adding process, all memory cells 207 store "1".

Area detecting unit 204 performs the area detecting process in the following manner. Specifically, first, area detecting unit 204 determines whether or not the YMCK data D3 successively input from image processing unit 14 is data in the image area (hereinafter referred to as the "image area data"), for each YMCK data D3 that corresponds to one mark image area, which will be described later. If it is determined to be the image area data, based on the address signal S4 input from main/sub scanning counter 202, "0" is written to memory cell 207 that corresponds to the image area data, of map memory 206. If it is determined not to be the image area data, namely, if it is determined to be image data in the specific area, no operation is done. The method of determining whether or not the YMCK data D3 is the image area data is not specifically limited and it may be any method generally used in the field of art. By way of example, a method is known in which if image data values in YMCK data D3 corresponding to one mark image area are not all "0", that is, if there is at least one "1", the data is determined to be the image area data.

Mark image adding unit 22 includes a delay buffer 222, a main/sub scanning counter 224, a mark image generating unit 226, and a mark image combining unit 228.

Delay buffer 222 is an FIFO (First-In First-Out) type memory. After the area detecting unit 204 ends the area detecting process of a number of lines that correspond to one mark image area, until at least the first result of determination is written to map memory 206, delay buffer 222 holds timing signal S3 and YMCK data D3 input from image processing unit 14. Then, after held as described above, timing signal S3 is output to main/sub scanning counter 224 and an LSU (Laser Scanning Unit) 246 of printer unit 24, and YMCK data D3 is successively transferred to mark image combining unit 228. In this manner, delay buffer 222 can delay output of timing signal S3 and transfer of YMCK data D3. Therefore, until the area detecting process for YMCK data D3 corresponding to one mark image area ends, it is possible to delay the start of the process for forming a combined data D6 by mark image combining unit 228.

In response to the timing signal S3 input from delay buffer 222, main/sub scanning counter 224 generates an address signal S5 indicating addresses in the main and sub scanning directions of YMCK data D3, and outputs the generated address signal S5 to mark image combining unit 228. The address signal S5 also has a function of a timing signal indicating the timing of reading information D5 from map memory 206. Main/sub scanning counter 224 further outputs a timing signal S6 indicating the timing of forming a mark image data D4, in synchronization with the output of address signal S5, to mark image generating unit 226.

Figure 5:
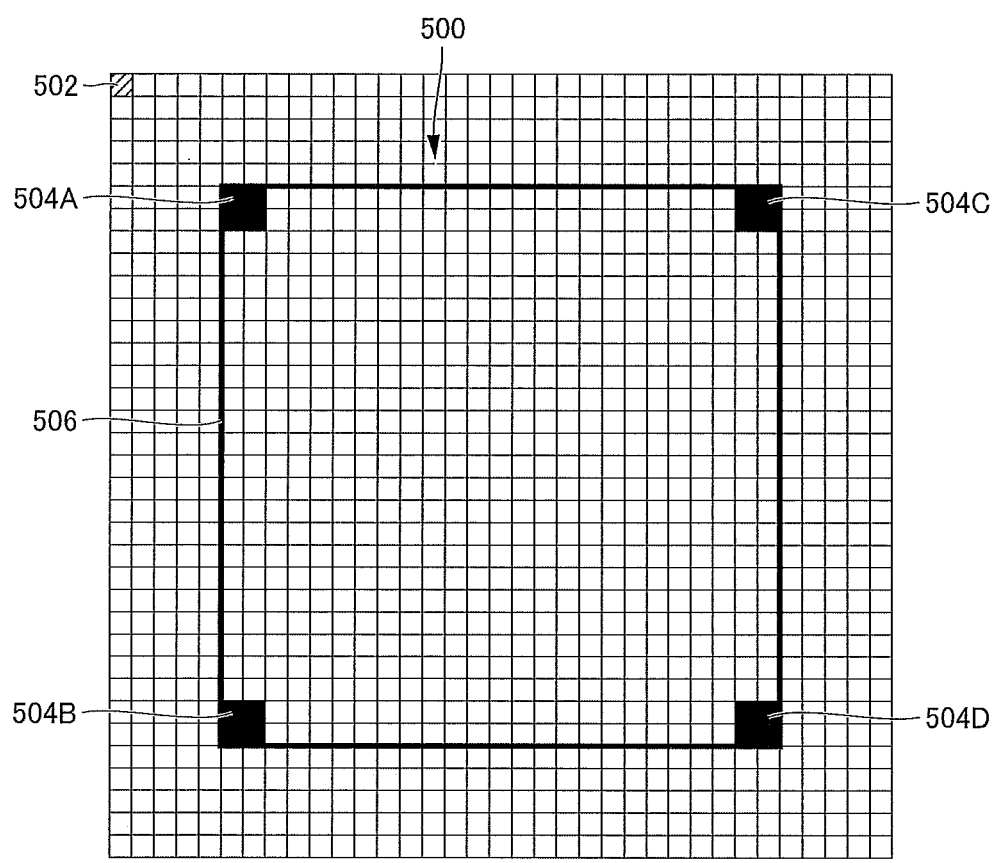
FIG. 5 shows an exemplary mark image based on the mark image data.

Mark image generating unit 226 forms mark image data D4 in response to timing signal S6, and outputs the formed mark image data D4 to mark image combining unit 228. Referring to FIG. 5, the image based on the image data such as YMCK data D3 consists of a plurality of pixels 502 arranged in the main and sub directions in the form of a matrix. In a mark image 500, 2×2 pixels form one dot 504. In the following, when dots 504 are to be distinguished from each other, alphabets are added to the reference numbers, and if the dot is generally referred to, only the reference number is used. Mark image 500 is formed of four dots 504A to 504D arranged at vertexes of a square area formed by two sides parallel in the main scanning direction and two sides parallel in the sub scanning direction. The distance between each of the four dots 504A to 504D is 1 mm. In the following, the square area will be referred to as a mark image area 506.

Though a dot 504 is not limited to a point formed of 2×2 pixels, it is preferably a point formed of 1×1 to 8×8 pixels. The distance between the dots 504 is not limited to 1 mm.

In response to the address signal S5 input from main/sub scanning counter 224, mark image combining unit 228 successively reads information D5 stored in memory cells 207, and based on the read information D5, determines whether or not the YMCK data D3 successively transferred from delay buffer 222 is the image area data, for each YMCK data D3 that corresponds to one mark image area. If it is determined not to be the image area data, that is, if "1" is read from the corresponding memory cell 207, YMCK data D3 and mark image data D4 input from mark image generating unit 226 are combined to form combined data D6. Combined data D6 is output to printer unit 24. On the other hand, if it is determined to be the image area data, that is, if "0" is read from the corresponding memory cell 207, data combining operation does not take place, and YMCK data D3 is directly output as combined data D6 to printer unit 24.

Printer unit 24 includes an image memory 242 and a printing unit 244. Image memory 242 includes an RAM. In accordance with an instruction from control unit 10 or the like, image memory 242 temporarily stores, page by page, YMCK data D3 successively input from image processing unit 14 or combined data D6 successively input from mark image adding unit 22, to be transmitted to printing unit 244, and outputs the stored YMCK data D3 or combined data D6 to printing unit 244 in synchronization with image formation by printing unit 244. Printing unit 244 includes an LSU 246. Printing unit 244 further includes a photoreceptor drum, a charger, a developer, a transfer device, a cleaning device and a fixing device, as well as a toner cartridge detachably mounted on image forming apparatus 1, a manual paper feed tray, and first and second paper feed trays (all not shown). Manual paper feed tray and the first and second paper feed trays are arranged to be positioned vertically from the top in this order, and hold sheets of recording paper and feeds the sheets of recording paper to the paper feeding unit (not shown). The manual paper feed tray is for the user to manually place a desired sheet of recording paper, and the first and second paper feed trays are to hold sheets of recording paper of different sizes. Printing unit 244 prints, in accordance with an instruction from control unit 10 or the like, an image based on YMCK data D3 transmitted from image memory 242 or based on combined data D6 (hereinafter referred to as the "first image") on the sheet of recording paper fed through the paper feeding unit from any of the paper feed trays described above.

Figure 6A:
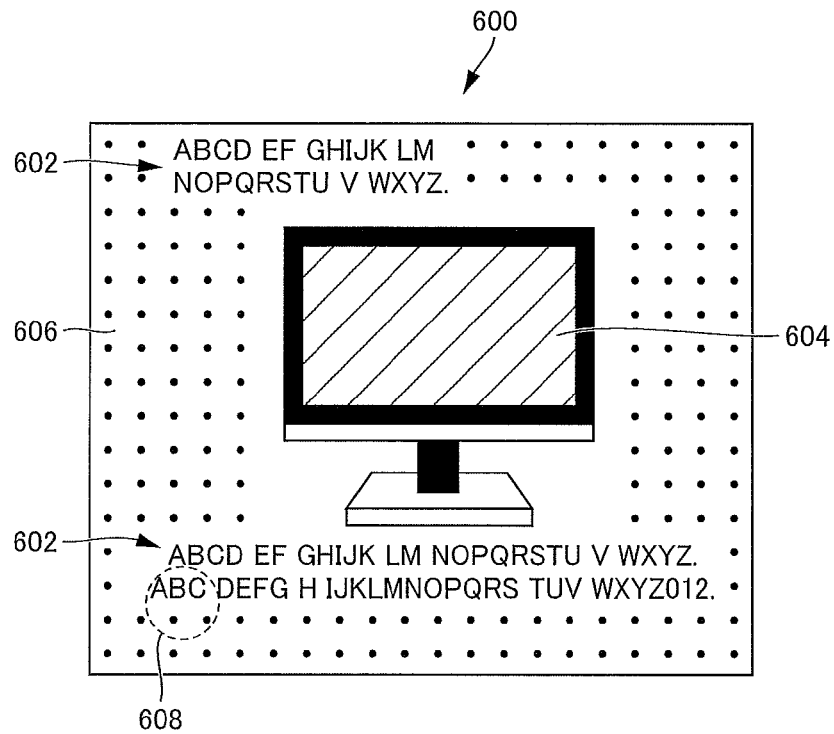
FIG. 6A shows a first image as a whole.
Figure 6B:
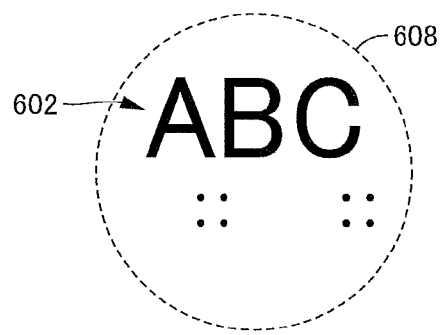
FIG. 6B is an enlarged view of an area surrounded by a dotted line in the first image.

Referring to FIGS. 6A and 6B, the first image 600 includes a character area 602, a figure area 604, and a mark area 606 other than the character area 602 and figure area 604. Character area 602 and figure area 604 are areas that correspond to the image area, while mark area 606 is an area that corresponds to the specific area. In mark area 606, a plurality of mark images 500 based on mark image data D4 are provided arranged in the main and sub scanning directions with a certain predetermined interval between each other. Though the color of mark image 500 is not specifically limited, yellow is particularly preferable. In the present embodiment, image forming apparatus 1 is capable of color printing. Therefore, mark images 500 are printed with yellow toner. In the following, a sheet of recording paper on which the first image 600 is printed will be denoted as a "mark added document."

Figure 6C:
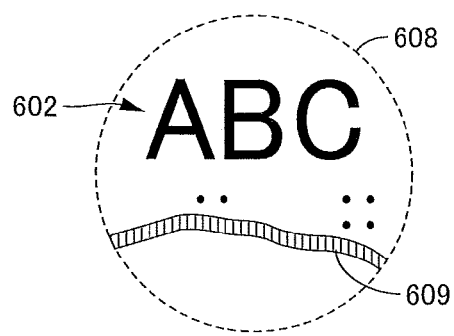
FIG. 6C shows a state in which a hand-written image is formed on the first image.

Referring to FIG. 6C, the user forms, as a mark, for example, a hand-written image 609 on mark area 606 of the first image 600. Hand-written image 609 is, for example, a line image drawn with a pen of black ink. In the present embodiment, four dots 504 forming a mark image 500 are arranged to have a certain predetermined interval (1 mm) between each other. Specifically, four dots 504 are arranged to have an interval wider than the thickness of a line image formed by a typically used pen. Therefore, while hand-written image 609 is formed on part of mark image 500, that is, on two dots 504, mark image 500 is not fully covered by hand-written image 609.

Operation panel 26 includes a display output unit formed of a liquid crystal display, and an operation interface unit including operation keys and a touch panel. The display output unit provides the user with various pieces of information, including pieces of information related to the state of image forming apparatus 1 and state of various processes. The operation interface unit provides an interface for the user to operate image forming apparatus 1. Operation panel 26 is formed by superposing a liquid crystal display and a touch panel, and it provides an interactive operation interface for the user. The interactive operation interface receives a user instruction related to the overall operation of image forming apparatus 1 through the touch panel and displays contents of the instruction on the liquid crystal display, and in addition, outputs a control signal in accordance with the instruction to control unit 10, the MPU of image processing unit 14 or the like. Operation panel 26 includes a power key for instructing power on and power off, a print start key to start a print job, a mark addition key to start the mark adding process, and a specific area image processing key for starting the image processing of the specific area.

When a user selects the mark addition key and thereafter presses the print start key on operation panel 26, the mark adding process starts. When the user selects the image processing key for the specific area and thereafter presses the print start key, the image processing for the specific area starts.

Figure 7:
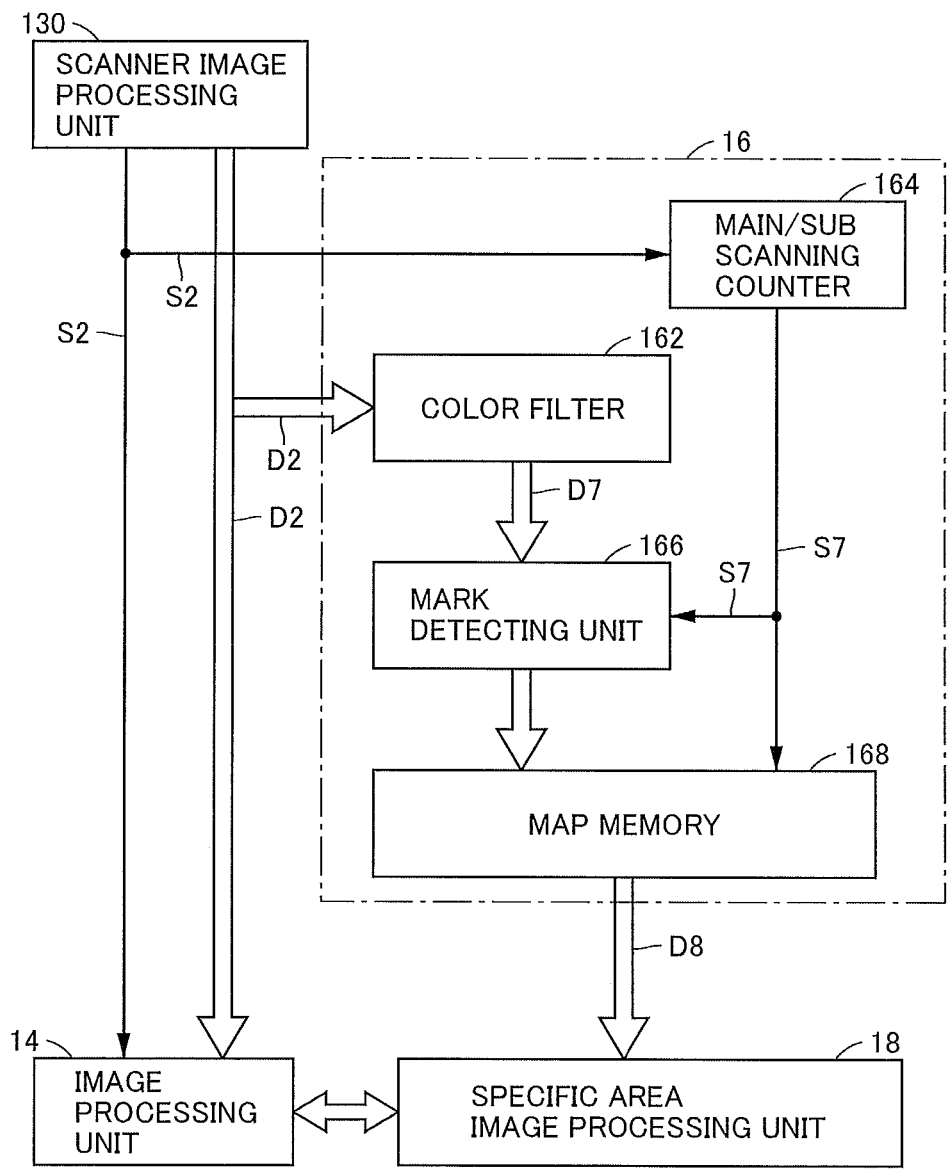
FIG. 7 is a block diagram showing a series of data flow in an image processing for the specific area.

Referring to FIG. 7, mark area extracting unit 16 includes a color filter 162, a main/sub scanning counter 164, a mark detecting unit 166, and a map memory 168.

Color filter 162 extracts data of yellow component (hereinafter referred to as "yellow data") D7 from RGB data D2 successively input from scanner image processing unit 130, and transfers the data to mark detecting unit 166. Therefore, only the yellow data D7 extracted by color filter 162 is output to mark detecting unit 166.

In response to the timing signal S2 input from scanner image processing unit 130 at the time of image processing for the specific area, main/sub scanning counter 164 generates an address signal S7 indicating addresses in the main and sub scanning directions of RGB data D2, and outputs the generated address signal S7 to mark detecting unit 166 and map memory 168. Address signal S7 also has a function of a timing signal indicating the timing of writing information to map memory 168.

Figure 8:
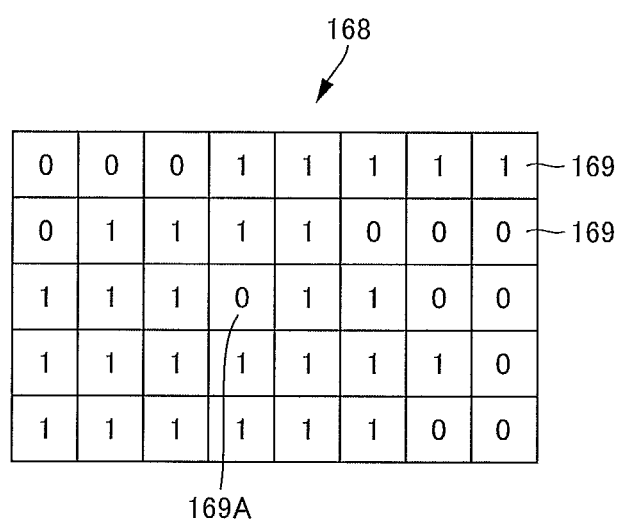
FIG. 8 shows a structure of a map memory.

Referring to FIG. 8, map memory 168 is a memory formed such that one memory cell 169 corresponds to a piece of information of one mark image area. Each memory cell 169 can store information of 1 bit. In map memory 168, if a memory cell 169 stores "0", it indicates that the corresponding area is an area where mark image 500 is not formed, and if it stores "1", it indicates that the corresponding area is the mark area 606 where mark image 500 is formed. When a timing signal S2 as a last signal indicating stop of printing is input from scanner image processing unit 130, memory cells 169 are all initialized to store "0". Thus, it follows that at the start of image processing for the specific area, all memory cells store "0".

Mark detecting unit 166 performs the mark image detecting process in the following manner, based on the address signal S7 input from main/sub scanning counter 164 and yellow data D7 input from color filter 162. Specifically, mark detecting unit 166 first detects data that provides a solid image of a point formed of 2×2 pixels in yellow data D7 around which there is no data of solid image, as dot data corresponding to one dot 504. Thereafter, mark detecting unit 166 determines whether or not other three dots 504 exist at positions of a certain predetermined distance in the main and sub scanning directions from the dot 504 based on the detected dot data. If it is determined that other three dots 504 exist, an area surrounded by the four dots 504 is determined to be a mark image area 506, and based on address signal S7, "1" is written to memory cells that correspond to mark image area 506. Otherwise, no operation is done. After completing the mark image detecting process for RGB data D2 of one page, mark detecting unit 166 outputs an end signal (not shown) indicating the end of mark image detecting process, to specific area image processing unit 18.

Specific area image processing unit 18 is actually realized by a program executed by control unit 10. In response to the end signal input from mark detecting unit 166, specific area image processing unit 18 reads information D8 stored in map memory 168. Based on the read information D8, an image erasing process for erasing image data in mark area 606, in which mark image 500 is formed, is performed on RGB data D2 that is subjected to image processing by image processing unit 14.

At this time, specific area image processing unit 18 determines the area where "1" is stored in memory cell 169 to be mark area 606. Here, it also performs the following process. Assume, for example, that a hand-written image 609 is formed on two dots 504 as a part of mark image 500 (see FIG. 6C), so that yellow data D7 that correspond to these two dots 504 are not detected by color filter 162. In such a situation, the mark image detecting process by mark detecting unit 166 cannot accurately be done. As a result, "0" is erroneously stored in the corresponding memory cell 169. In order to prevent erroneous determination resulting from the erroneous storage, if a memory cell 169 storing "0" is isolated (see memory cell 169A of FIG. 8), that is, if the memory cell 169 storing "0" is surrounded by memory cells 169 storing "1", specific area image processing unit 18 determines the area corresponding to the isolated memory cell 169 to be mark area 606.

NIC 28 provides an interface with network 3. Image forming apparatus 1 is capable of data communication with information processing apparatus 2 on network 3 through NIC 28.

Power control unit 30 is electrically connected to an external power source 302. Power control unit 30 obtains electric power necessary for operations of various components of image forming apparatus 1 from external power source 302, and supplies the obtained electric power to various components of image forming apparatus 1.

Through the operations of various components mentioned above, image forming apparatus 1 executes any of a number of operation modes including a copy mode in which an original image is read and printed on a sheet of recording paper, a printer mode in which image data transmitted from information processing apparatus 2 is received and printed on a sheet of recording paper, and a scanner mode in which an original image is read and transmitted to information processing apparatus 2 or the like, in accordance with an input operation of a user through operation panel 26 or an instruction from information processing apparatus 2.

(Operation)

Referring to FIGS. 1 to 8, Image Forming Apparatus 1 in Accordance with the present embodiment operates in the following manner in the mark adding process and in the image processing for the specific area. Operations for realizing general functions of image forming apparatus 1 except for the operations in the mark adding process and in the image processing for the specific area are the same as the operations of a conventional image forming apparatus.

(Operation in the Mark Adding Process)

At the start of mark adding process, all memory cells 207 (see FIG. 4) of map memory 206 store "1". A user places an original document 100 on a platen (not shown), selects the mark addition key on operation panel 26, and presses the print start key. When the print start key is pressed, scanner unit 12 forms RGB data D2 based on the original image of original document 100 placed on the platen, and successively outputs the formed RGB data D2 to image processing unit 14 in synchronization with timing signal S2. Based on the RGB data D2 input successively in synchronization with timing signal S2, image processing unit 14 forms YMCK data D3. Then, it successively outputs the formed YMCK data D3 in synchronization with timing signal S3, to specific area extracting unit 20 and mark image adding unit 22.

In specific area extracting unit 20, main/sub scanning counter 202 generates address signal S4 in response to timing signal S3 input from image processing unit 14, and successively outputs the generated address signal S4 to area detecting unit 204 and map memory 206.

Area detecting unit 204 determines, for every YMCK data D3 corresponding to one mark image area, whether or not the YMCK data D3 successively input from image processing unit 14 is the image area data. If it is determined to be the image area data, "0" is written to memory cell 207 that corresponds to the image area data of map memory 206, based on address signal S4 input from main/sub scanning counter 202. On the other hand, if it is determined not to be the image area data, that is, determined to be image data of the specific area, no operation is done.

In mark image adding unit 22, after the area detecting unit 204 ends the area detecting process of a number of lines that correspond to one mark image area, until at least the first result of determination is written to map memory 206, delay buffer 222 holds timing signal S3 and YMCK data D3 input from image processing unit 14. Then, after held as described above, timing signal S3 is output to main/sub scanning counter 224 and an LSU 246 of printer unit 24, and YMCK data D3 is successively transferred to mark image combining unit 228.

In response to the timing signal S3 input from delay buffer 222, main/sub scanning counter 224 generates an address signal S5, and outputs the generated address signal S5 to mark image combining unit 228. Main/sub scanning counter 224 further outputs a timing signal S6, in synchronization with the output of address signal S5, to mark image generating unit 226.

Mark image generating unit 226 forms mark image data D4 in response to timing signal S6, and outputs the formed mark image data D4 to mark image combining unit 228.

In response to the address signal S5 input from main/sub scanning counter 224, mark image combining unit 228 successively reads information D5 stored in memory cells 207, and based on the read information D5, determines whether or not the YMCK data D3 successively transferred from delay buffer 222 is the image area data, for each YMCK data D3 that corresponds to one mark image area. If it is determined not to be the image area data, that is, if "1" is read from the corresponding memory cell 207, YMCK data D3 and mark image data D4 are combined to form combined data D6. Combined data D6 is output to printer unit 24. On the other hand, if it is determined to be the image area data, that is, if "0" is read from the corresponding memory cell 207, data combining operation does not take place, and YMCK data D3 is directly output as combined data D6 to printer unit 24. If combined data D6 based on the last YMCK data D3 is output, timing signal S3 as a last signal indicating stop of printing is input from image processing unit 14, and all memory cells 207 in map memory 206 are initialized.

Printer unit 24 prints the first image 600 (see FIG. 6) based on combined data D6 successively input from mark image combining unit 228 on a sheet of recording paper. At this time, mark image 500 in mark area 606 of the first image 600 is printed with yellow toner.

(Operation in Image Processing for the Specific Area)

At the start of image processing for the specific area, all memory cells 169 (see FIG. 8) of map memory 168 store "0". The user forms a hand-written image 609 using a pen of black ink, on mark area 606 of the mark added document, on which the first image 600 is printed. Then, the user places the mark added document with the hand-written image 609 on a platen (not shown), selects the image processing key for the specific area on operation panel 26, and presses the print start key. When the print start key is pressed, scanner unit 12 forms RGB data D2 based on the original image of the mark added document placed on the platen, and successively outputs the formed RGB data D2 to image processing unit 14 and mark area extracting unit 16, in synchronization with timing signal S2.

In mark area extracting unit 16, color filter 162 extracts yellow data D7 from RGB data D2 successively input from scanner image processing unit 130, and transfers the extracted data to mark detecting unit 166.

In response to the timing signal S2 input from scanner image processing unit 130, main/sub scanning counter 164 generates address signal S7, and outputs the generated address signal S7 to mark detecting unit 166 and map memory 168.

Mark detecting unit 166 performs the mark image detecting process in the following manner, based on the address signal S7 input from main/sub scanning counter 164 and yellow data D7 input from color filter 162. Specifically, mark detecting unit 166 first detects data that provides a solid image of a point formed of 2×2 pixels in yellow data D7 around which there is no data of solid image, as dot data corresponding to one dot 504A (see FIG. 5). Thereafter, based on yellow data D7, mark detecting unit 166 determines whether or not other three dots 504B to 504D exist at positions of a certain predetermined distance in the main and sub scanning directions from the dot 504A based on the detected dot data. If it is determined that other three dots 504B to 504D exist, an area surrounded by the four dots 504A to 504D is determined to be a mark image area 506, and based on address signal S7, "1" is written to memory cells that correspond to mark image area 506. Otherwise, no operation is done. After completing the mark image detecting process for RGB data D2 of one page, mark detecting unit 166 outputs an end signal (not shown) to specific area image processing unit 18.

Based on RGB data D2 successively input in synchronization with timing signal S2, image processing unit 14 forms YMCK data D3. At this time, in response to the end signal input from mark detecting unit 166, specific area image processing unit 18 reads information D8 stored in map memory 168. Based on the read information D8, an image erasing process for erasing image data in mark area 606, in which mark image 500 is formed, is performed on RGB data D2 that is subjected to image processing by image processing unit 14. Image processing unit 14 successively outputs the thus formed YMCK data D3 with the image erased, to printer unit 24 in synchronization with timing signal S3. When the last YMCK data D3 is output, timing signal S2 as the last signal indicating stop of printing is output from scanner image processing unit 130, and all memory cells 169 in map memory 168 are initialized.

Printer unit 24 prints a print image (hereinafter referred to as a "second image") based on the YMCK data D3 successively input from image processing unit 14 on a sheet of recording paper. Here, the second image is printed with handwritten image 609 erased.

[Modification]

A modification of image forming apparatus 1 has the same configuration as image forming apparatus 1 in accordance with the above-described embodiment except that a specific area extracting unit 70 is provided in place of specific area extracting unit 20. In the present modification, components having the same functions as those of image forming apparatus 1 are denoted by the same reference characters and same names, and detailed description thereof will not be repeated.

Figure 9:
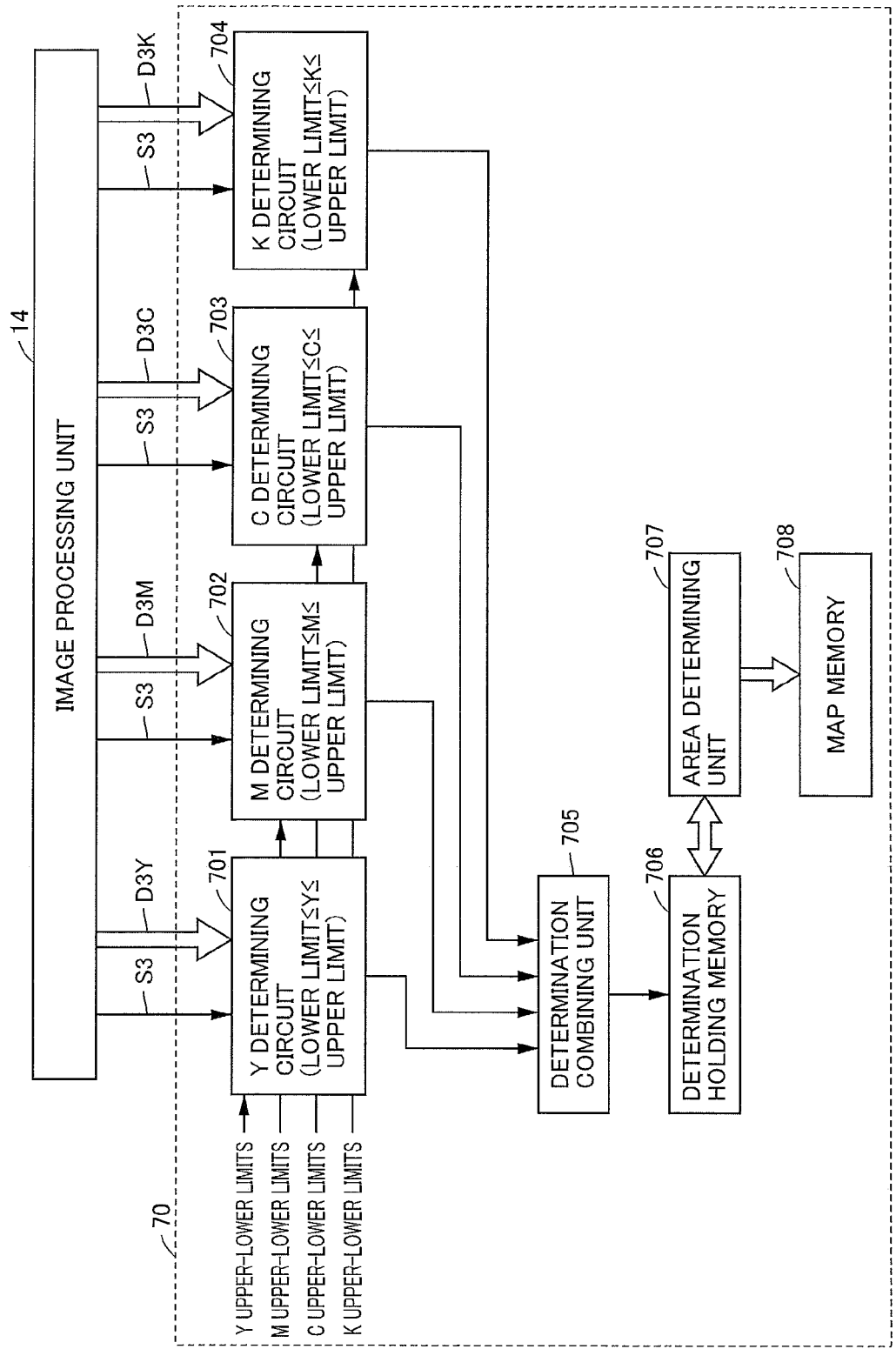
FIG. 9 is a block diagram showing a part of a series of data flow in the mark adding process in accordance with a modification.

Referring to FIG. 9, specific area extracting unit 70 includes a Y determining circuit 701, an M determining circuit 702, a C determining circuit 703, a K determining circuit 704, a determination combining unit 705, a determination holding memory 706 implemented by an RAM, an area determining unit 707, and a map memory 708.

YMCK data D3 input from image processing unit 14 is divided to Y data D3Y, M data D3M, C data D3C and K data D3K and input to Y determining circuit 701, M determining circuit 702, C determining circuit 703 and K determining circuit 704, respectively.

In Y determining circuit 701, M determining circuit 702, C determining circuit 703 and K determining circuit 704, an upper limit and a lower limit of image density value (hereinafter referred to as "upper-lower limits") are set in advance. The upper-lower limits are set such that if the image density value is within the range of upper-lower limits, the corresponding image density represents a density that allows easy formation of a hand-written image.

Y determining circuit 701, M determining circuit 702, C determining circuit 703 and K determining circuit 704 determine, for every data corresponding to one mark image area, whether or not the image density value is within the range of predetermined upper-lower limits, based on density signals included in Y data D3Y, M data D3M, C data D3C and K data D3K successively input from image processing unit 14, in response to timing signal S3 input from image processing unit 14 in the mark adding process, respectively. If it is determined to be within the range of upper-lower limits, a signal indicating "1" is output to determination combining unit 705. On the other hand, if it is determined to be out of the range of upper-lower limits, a signal indicating "0" is output to determination combining unit 705.

Determination combining unit 705 is an AND circuit. If the signals input from Y determining circuit 701, M determining circuit 702, C determining circuit 703 and K determining circuit 704 are all signals indicating "1", determination combining unit 705 has information indicating "1" stored in determination holding memory 706. On the other hand, if there is even one signal that indicates "0", it has information indicating "0" stored in determination holding memory 706. Thus, pieces of information, each indicating whether or not the image density of YMCK data D3 corresponding to one mark image area is a density allowing easy formation of hand-written image, are successively stored in determination holding memory 706.

Map memory 708 is a memory formed such that one memory cell corresponds to a piece of information of a certain predetermined area (in the present modification, an area of 2 cm×2 cm). Each memory cell can store information of 1 bit. In map memory 708, if a memory cell stores "0", it indicates that the corresponding area is an area where a mark image is not formed, and if it stores "1", it indicates that the corresponding area is where a mark image is formed. Here, the area where the mark image is formed refers to the area that corresponds to an area of a certain predetermined area or larger and in which an image having image density within a certain predetermined range is formed (hereinafter referred to as a "specific area") in the original image of original document 100. The area where a mark is formed refers to an area that corresponds to an area or areas other than the specific area, in the original image of original document 100. When a timing signal S3 as a last signal indicating stop of printing is input from image processing unit 14, the memory cells are all initialized to store "1". Thus, it follows that at the start of mark adding process, all memory cells store "1".

Area determining unit 707 is actually realized by a program executed by control unit 10. When the pieces of information stored in determination holding memory 706 reach an amount of information corresponding to a certain predetermined area, area determining unit 707 adds the pieces of information of the certain area. If the added sum is smaller than a predetermined threshold value, "0" is written in the corresponding memory cell in map memory 708. If the added sum is equal to or larger than the predetermined threshold, that is, if the image density of a certain predetermined area is the image density that allows easy formation of hand-written image, no operation is performed. The threshold mentioned above is stored in advance in HDD 108.

<Operation>

Referring to FIG. 9, the modification of image forming apparatus 1 operates in the following manner in the mark adding process. Operations other than the operation in specific area extracting unit 70 are the same as those of image forming apparatus 1 described above. Therefore, detailed description of the same operations will not be repeated.

(Operation in the Mark Adding Process)

At the start of mark adding process, all memory cells in map memory 708 store "1". Image processing unit 14 successively outputs the formed YMCK data D3 to specific area extracting unit 70 and mark image adding unit 22, in synchronization with timing signal S3. At this time, of YMCK data D3 input to specific area extracting unit 70, Y data D3Y is input to Y determining circuit 701, M data D3M is input to M determining circuit 702, C data D3C is input to C determining circuit 703 and K data D3K is input to K determining circuit 704, respectively.

Y determining circuit 701, M determining circuit 702, C determining circuit 703 and K determining circuit 704 determine, for every data corresponding to one mark image area, whether or not the image density value is within the range of predetermined upper-lower limits, based on density signals included in Y data D3Y, M data D3M, C data D3C and K data D3K successively input from image processing unit 14, in response to timing signal S3 input from image processing unit 14, respectively. If it is determined to be within the range of upper-lower limits, a signal indicating "1" is output to determination combining unit 705. On the other hand, if it is determined to be out of the range of upper-lower limits, a signal indicating "0" is output to determination combining unit 705.

If the signals input from Y determining circuit 701, M determining circuit 702, C determining circuit 703 and K determining circuit 704 are all signals indicating "1", determination combining unit 705 has information indicating "1" stored in determination holding memory 706. On the other hand, if there is even one signal that indicates "0", it has information indicating "0" stored in determination holding memory 706.

When the pieces of information stored in determination holding memory 706 reach an amount of information corresponding to a certain predetermined area (corresponding to 2 cm×2 cm), area determining unit 707 adds the pieces of information of the certain area. If the added sum is smaller than a predetermined threshold value, "0" is written in the corresponding memory cell in map memory 708. If the added sum is equal to or larger than the predetermined threshold, that is, if the image density of a certain predetermined area is the image density that allows easy formation of hand-written image, no operation is performed.

In mark image adding unit 22, after the area determining unit 707 ends the above-described process of a number of lines that correspond to the certain predetermined area, until at least the first result of determination is written to map memory 708, delay buffer 222 holds timing signal S3 and YMCK data D3 input from image processing unit 14. Then, after held as described above, timing signal S3 is output to main/sub scanning counter 224 and an LSU 246 of printer unit 24, and YMCK data D3 is successively transferred to mark image combining unit 228.

Figure 10:
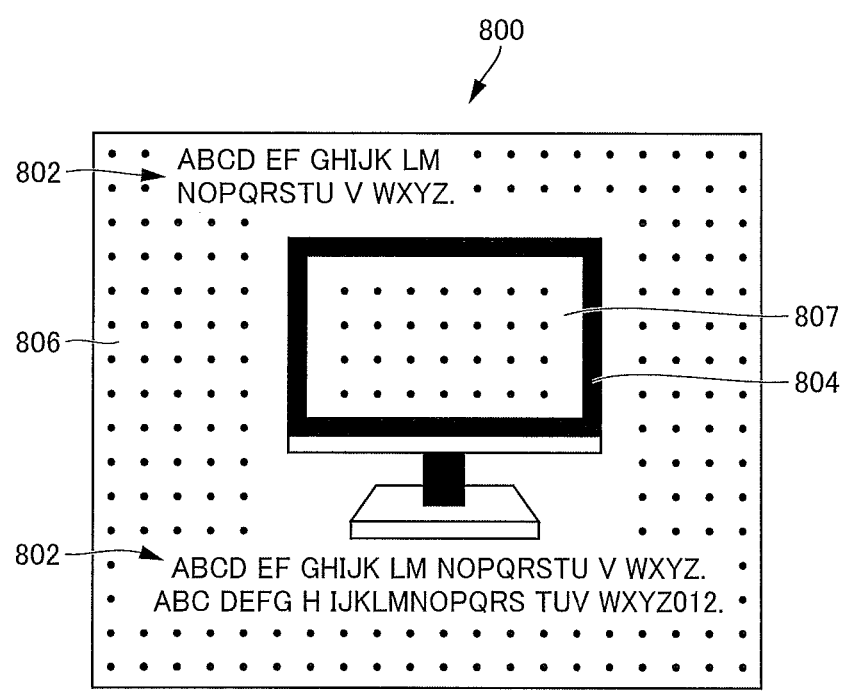
FIG. 10 shows an example of the first image in accordance with the modification.

Referring to FIG. 10, the first image 800 includes a character area 802, a figure area 804, and a background area 806 other than character area 802 and figure area 804. Background area 806 and a part 807 of figure area 804 are mark areas corresponding to the specific areas. In the mark areas, a plurality of mark images 500 based on mark image data D4 are provided, arranged at a certain predetermined interval from each other in the main and sub scanning directions.

<Functions/Effects>

According to the embodiment and the modification described above, in the mark adding process, scanner unit 12 and image processing unit 14 form YMCK data D3 based on the original image including a specific area; specific area extracting units 20 and 70 extract image data of the specific area from the YMCK data D3; mark image adding unit 22 forms combined data D6 by combining the image data in the extracted specific area with mark image data D4 for outputting mark image 500; and printer unit 24 outputs first images 600 and 800 including the mark area, based on combined data D6. Further, in the image processing for the specific area, scanner unit 12 forms RGB data D2 based on the first images 600 and 800; mark area extracting unit 16 extracts image data of the mark area from RGB data D2; specific area image processing unit 18 performs a prescribed image processing on the extracted image data of the mark area of RGB data D2; and printer unit 24 outputs the second image based on the YMCK data D3 after the prescribed image processing.

In this manner, as the mark area is formed in the area corresponding to the specific area of the original image of first images 600 and 800 and the image data in the mark area is extracted from the RGB data D2 based on the first images 600 and 800, it is possible to reliably and easily extract the hand-written image formed in the mark area. Further, since the prescribed image processing is performed on the extracted data of the mark area, it is possible to execute the desired image processing reliably on the image data based on the hand-written data.

Figure 11:
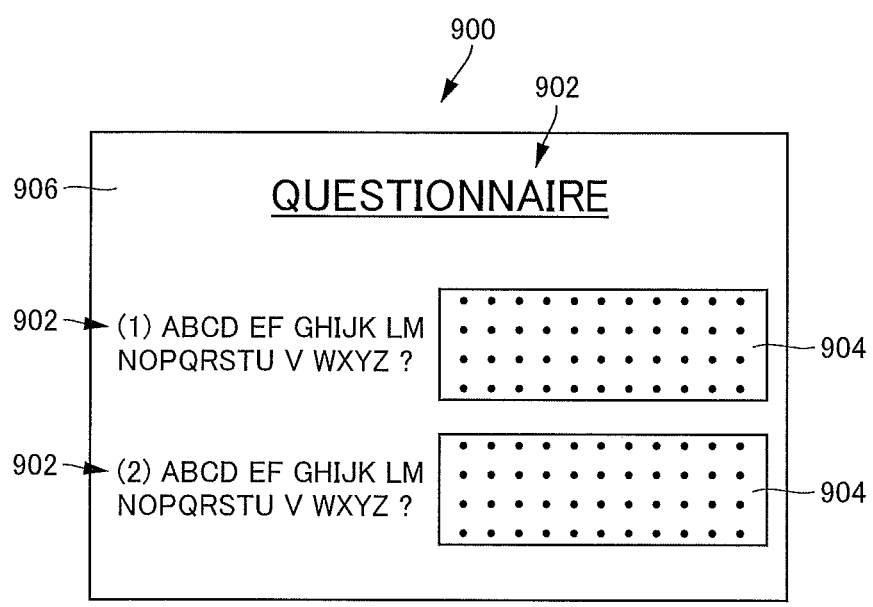
FIG. 11 shows another example of the first image.

Further, according to the embodiment above, the specific area is the area where no image is formed, of the original image of original document 100. According to the modification described above, the specific area is an area of a certain predetermined area or larger where an image having an image density within a certain predetermined range is formed, on the original image of original document 100. The specific area is not limited to the areas described above. By way of example, the specific area may be an area where an image having a certain predetermined brightness or higher is formed in the original image of original document 100, or an area where an image having a certain predetermined color is formed. Further, the specific area may be an area determined in advance as an area where the hand-written image is to be formed. Referring to FIG. 11, a first image 900 is a questionnaire sheet, including a character area 902, a mark area 904, and a background area 906 other than character area 902 and mark area 904. Mark area 904 is the specific area determined in advance as an answer column, in which the user writes his/her answer to the question by hand. In mark area 904, a plurality of mark images 500 are provided to be arranged with a constant interval from each other in the main and sub scanning directions.

In any case, it is preferred that an area in which formation of a hand-written image is highly expected is set as the specific area. This makes it easier and more reliable to extract the hand-written image. Further, it becomes possible to more reliably perform a desired image processing on the image data based on the hand-written image.

In the embodiment and the modification described above, the color of mark image 500 is yellow. Since the color of mark image 500 is yellow, which is a color difficult to visually recognize, degradation of quality of the first images 600 and 800 caused by adding mark image 500 can be minimized.

In the embodiment and the modification described above, mark image 500 is formed of a plurality of dots 504, and a dot 504 is a point formed of 1×1 to 8×8 pixels. Since mark image 500 is formed of sufficiently small dots that are difficult to visually recognize, degradation of quality of the first images 600 and 800 caused by adding mark image 500 can be minimized, and lowering of visibility of the first images 600 and 800 can more reliably be prevented.

Further, in the embodiment and the modification described above, mark image 500 is formed of a plurality of dots 504 arranged at an interval of about 1 mm, and mark area extracting unit 16 extracts the image data in the mark area from RGB data D2 by detecting at least a part of the plurality of dots 504. In this manner, the plurality of dots 504 forming mark image 500 are arranged at an interval wider than the thickness of a line image formed by a typically used pen or the like, so that some of the plurality of dots 504 come to be out of the hand-written image. Thus, it is possible to prevent the entire mark image 500 from being covered by the hand-written image. Therefore, even when a hand-written image is formed on mark image 500, the image data in the mark area can reliably be extracted and, hence, the hand-written image formed in the mark area can more reliably be extracted.

Further, according to the embodiment described above, specific area image processing unit 18 erases image data in the extracted mark area of RGB data D2. Therefore, the hand-written image in the second image can be erased. Even when the original image of document 100 is lost, a document image similar to the original image of document 100 can be obtained.

Though specific area image processing unit 18 performs the image erasing process in the embodiment described above, the present invention is not limited to such an embodiment. By way of example, a pattern recognition process such as a process for recognizing hand-written characters may be performed. By way of example, assume that image processing for the specific area is performed on the first image 900 (see FIG. 11) that has an answer hand-written by the user in mark area 904. In that case, specific area image processing unit 18 reads information D8 stored in map memory 168, in response to the end signal input from mark detecting unit 166. Based on the read information D8, pattern recognition process is performed on the image data in mark area 904, of RGB data D2 that is being subjected to image processing by image processing unit 14. As a result, it becomes possible to recognize the hand-written image written in mark area 904 without any influence of the direction of the first image 900 placed on the platen (not shown) at the time of scanning and, therefore, it becomes possible to freely set the position of answer column. Further, from the position of mark area 904, it is possible to determine the direction of first image 900 placed on the platen. Further, it is unnecessary to perform pattern recognition on the entire RGB data D2 in order to recognize hand-written characters, and pattern recognition can be done after the direction of first image 900 is determined. This enables highly efficient pattern recognition.

In the embodiment above, mark detecting unit 166 outputs the end signal to specific area image processing unit 18 when the mark detecting process on RGB data D2 of one page ends. The present invention, however, is not limited to such an embodiment. Setting may be changed appropriately in accordance with the contents of image processing executed by specific area image processing unit 18. By way of example, if image processing is to be done on each data corresponding to mark image area 506, such as in the case of erasing only the mark image 500 by specific area image processing unit 18, the end signal may be output when the mark detecting process for RGB data D2 corresponding to one mark image area 506 ends.

In the embodiment above, in order to prevent erroneous determination resulting from erroneous storage process, specific area image processing unit 18 determines that memory cell 169A (see FIG. 8) storing an isolated "0" corresponds to mark area 606. The present invention, however, is not limited to such an embodiment. By way of example, if yellow data D7 corresponding to two dots 504 is extracted by color filter 162, an area including the two dots 504 may be determined to be the mark area 606. By such an approach, erroneous determination can be avoided even if a hand-written image 609 is formed on two dots 504 as a part of mark image 500 (see FIG. 6C).

Further, in the above-described embodiment, if it is determined that remaining three dots 504 exist at positions of a certain predetermined distance from dot 504 based on the detected dot data, mark detecting unit 166 determines that the area surrounded by the four dots 504 to be mark image area 506. The present invention, however, is not limited to such an embodiment. By way of example, if a dot data is detected, an area corresponding to one mark image area including the dot data may be determined to be the mark image area 506. If it is determined that a remaining dot 504 exists at a position of a certain predetermined distance from dot 504 based on the detected dot data, an area corresponding to one mark image area including the two dots data may be determined to be the mark image area 506. Thus, erroneous determination of mark detecting unit 166 can more reliably be reduced, and the process of extracting an isolated memory cell 169A storing "0" can be omitted. Thus, burden on mark detecting unit 166 can further be reduced.

In the embodiment above, the mark added document is formed by the mark adding process of image forming apparatus 1. The present invention, however, is not limited to such an embodiment. For example, the document may be formed by an image data forming process by information processing apparatus 2, or by a printing process by image forming apparatus 1. In that case, information processing apparatus 2 forms image data for outputting an image including characters, figures and the mark area in accordance with an instruction from the user using an application program such as a drawing tool or a word processor, converts the image data to printer description language using a printer driver, and transmits the result to image forming apparatus 1. Based on the image data received from information processing apparatus 2, image forming apparatus 1 prints the print image on a sheet of recording paper.

In the embodiment above, four dots 504 are arranged to be positioned as vertexes of a square area. The present invention, however, is not limited to such an embodiment. By way of example, dots may be arranged to be positioned at vertexes of a triangular area.

Further, in the embodiment above, image forming apparatus 1 is configured to perform both the mark adding process and the image processing for the specific area. The present invention, however, is not limited to such an embodiment. For instance, image forming apparatus 1 may be configured to perform either one of the mark adding process and the image processing for the specific area.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
    a first image data forming unit forming a first image data based on an original image including a feature area and a specific area;
    a specific area extracting unit extracting image data of said specific area from said first image data;
    a mark image adding unit combining the extracted image data of said specific area of said first image data and a mark image data for outputting a mark image, for forming combined data corresponding to the specific area; and
    a first output unit for printing a first image including a mark area as an area where said mark image is formed for receiving a handwritten image to be manually formed thereon, based on said combined data, and an original image area corresponding to the feature area of the original image where said mark image is not formed;
    a second image data forming unit forming a second image data based on said first image having, after said first image is printed, said handwritten image manually formed on said mark area;
    a mark area extracting unit extracting image data of said mark area, including the handwritten image formed on said mark area, from said second image data, by detecting the mark image in said second image data;
    a specific area image processing unit performing prescribed image processing on the extracted handwritten image data of said mark area of said second image data; and
    a second output unit outputting a second image based on the second image data after said prescribed image processing, wherein
    said feature area is an area where image features of the original image are substantially formed in said original image, and
    said specific area is an area where image features of the original image are determined not to be substantially formed, in said original image.

2. The image forming apparatus according to claim 1, wherein
    said specific area is an area of a certain predetermined area or larger in which an image having an image density value within a certain predetermined range is formed, of said original image.

3. The image forming apparatus according to claim 1, wherein
    said specific area is an area where an image having brightness of a certain predetermined value or higher is formed, of said original image.

4. The image forming apparatus according to claim 1, wherein
    color of said mark image is yellow.

5. The image forming apparatus according to claim 1, wherein
    said mark image is formed of a plurality of dots, and said dot is a point including 1×1 to 8×8 pixels.

6. The image forming apparatus according to claim 1, wherein
    said mark image is formed of a plurality of dots arranged to have a known prescribed interval from each other, and said mark area extracting unit extracts image data of said mark area from said second image data, by detecting at least a part of said plurality of dots.

7. The image forming apparatus according to claim claim 1, wherein said specific area image processing unit erases the extracted image data of said mark area, of said second image data.

8. The image forming apparatus according to claim 1, wherein said specific area image processing unit performs pattern recognition on the extracted image data of said mark area, of said second image data.

9. The image forming apparatus according to claim 1, wherein the feature area and the specific area are mutually exclusive.

10. The image forming apparatus according to claim 1, wherein said feature area includes one or more character areas and/or figure areas of the original image.

* * * * *